(12) United States Patent
Fancher, III

(10) Patent No.: US 8,550,531 B1
(45) Date of Patent: Oct. 8, 2013

(54) EXTENSIBLE SUN VISOR

(76) Inventor: Nelson Fancher, III, Mobile, AL (US)

( * ) Notice: Subject to any disclaimer, the term of this patent is extended or adjusted under 35 U.S.C. 154(b) by 0 days.

(21) Appl. No.: 13/449,032

(22) Filed: Apr. 17, 2012

(51) Int. Cl.
*B60J 3/02* (2006.01)
*B60J 3/04* (2006.01)

(52) U.S. Cl.
USPC ........................................ 296/97.8; 296/97.1

(58) Field of Classification Search
USPC ................................................ 296/97.8, 97.1
See application file for complete search history.

(56) References Cited

U.S. PATENT DOCUMENTS

| | | | | |
|---|---|---|---|---|
| 1,549,780 | A * | 8/1925 | Marchessault | 296/97.8 |
| 4,978,160 | A * | 12/1990 | Welschoff | 296/97.8 |
| 5,855,405 | A | 1/1999 | Robles | |
| 6,176,539 | B1 | 1/2001 | Westerman | |
| 6,325,443 | B1 | 12/2001 | Sanchez | |
| 7,540,553 | B1 | 6/2009 | Mullis | |

\* cited by examiner

*Primary Examiner* — Glenn Dayoan
*Assistant Examiner* — Melissa A Black

(57) ABSTRACT

An extensible sun visor for use in automobiles having a slidable tinted transparent insert moveable along a horizontal axis from a first position inside the sun visor to a second position outside the sun visor, the insert extended from a right edge of the visor, the sun visor having a transparent section overlying the tinted insert and a transparent portion underlying the insert, through which visor visibility is enabled when a mirror and cover are raised on an inside surface of the extensible sun visor.

3 Claims, 5 Drawing Sheets

EXTENSIBLE SUN VISOR

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of extensible sun visors are known in the prior art. However, what is needed is an extensible sun visor that includes an extensible tinted transparent insert slidingly moveable from a first position to a second position along a horizontal axis, to control glare while drying.

FIELD OF THE INVENTION

The present invention relates to an extensible sun visor, and more particularly, to an extensible sun visor that includes an extensible tinted transparent insert slidingly moveable from a first position to a second position along a horizontal axis to control glare while drying.

SUMMARY OF THE INVENTION

The general purpose of the extensible sun visor, described subsequently in greater detail, is to provide an extensible sun visor which has many novel features that result in an extensible sun visor which is not anticipated, rendered obvious, suggested, or even implied by prior art, either alone or in combination thereof.

The present extensible sun visor has been devised to control glare while driving. Many motorists know the hazards of driving toward the sun, whereby they are dazzled and unable to see for a period of time. Lack of visibility, even for the shortest interval, is exceedingly dangerous when operating a motor vehicle. To avoid accidents, and provide for safer driving conditions by improving visibility, I have invented the instant extensible sun visor to replace a standard sun visor in an ordinary automobile.

The present device easily attaches to the interior roof of a vehicle at the standard visor attachment points, effectively replacing a standard sun visor installed in an automobile at the time of manufacture. While the present device operates in a fashion similar to the standard sun visor typical of most automobiles, the present device has many improvements over such standard sun visors.

The instant extensible sun visor is larger than a standard visor, and includes a slidable tinted insert which may be extended horizontally from within the sun visor out of a right edge of the sun visor, effectively increasing the effect of the sun visor toward the passenger side of the vehicle. Sunlight entering the vehicle windshield from the passenger side is thusly controlled, and glare reduced, through the tinted insert. The driver is able to see through the tinted insert and can continue to operate the automobile uninterrupted.

A clear strap is attached to the visor right edge, overlying the insert when the insert is in the closed position. When the insert is extended outwards, the clear strap lifts upward to rest on an upper edge of the insert. When the insert is moved to the closed position, and the insert slid inside the extensible sun visor, the clear strap lies along the visor right edge and attaches to the bottom edge of the sun visor at a hook and loop fastener. This ensures the insert doesn't slide outwards unintentionally, and secures the insert in place.

The extensible sun visor has a mirror pivotally attached to an inside surface of the sun visor. When the sun visor is moved downward in the normal fashion, the inside surface is presented toward the driver. The driver may then lift a cover from the mirror, the cover pivoting upwards. The driver may then view the mirror. The mirror also pivots upwardly. Behind the mirror is a transparent section inside of which the insert slides. This enables the driver to see through the visor when the mirror and cover are pivoted to an upward position; visibility is enabled, the driver can see through the transparent section and insert to control and limit glare. When the insert is extended, the transparent section and the insert form a continuous tinted aperture through which the driver may focus his/her gaze to control and limit glare, as desired.

The present extensible sun visor has been devised to make driving conditions safer in bright and sunny conditions, thereby lessening accidents and making driving more comfortable.

Thus has been broadly outlined the more important features of the present extensible sun visor so that the detailed description thereof that follows may be better understood and in order that the present contribution to the art may be better appreciated.

Objects of the present extensible sun visor, along with various novel features that characterize the invention are particularly pointed out in the claims forming a part of this disclosure. For better understanding of the extensible sun visor, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
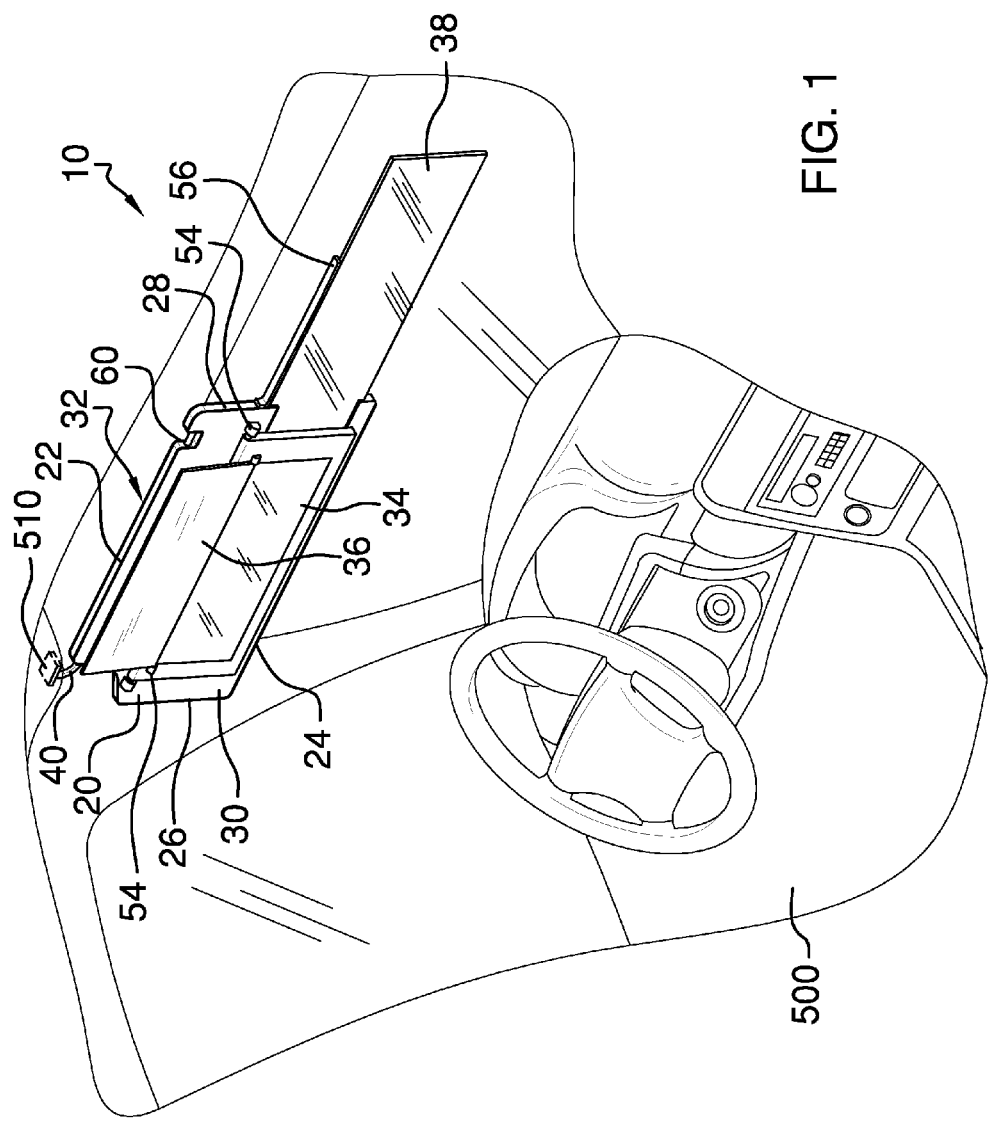
FIG. 1 is an isometric view.
Figure 2:
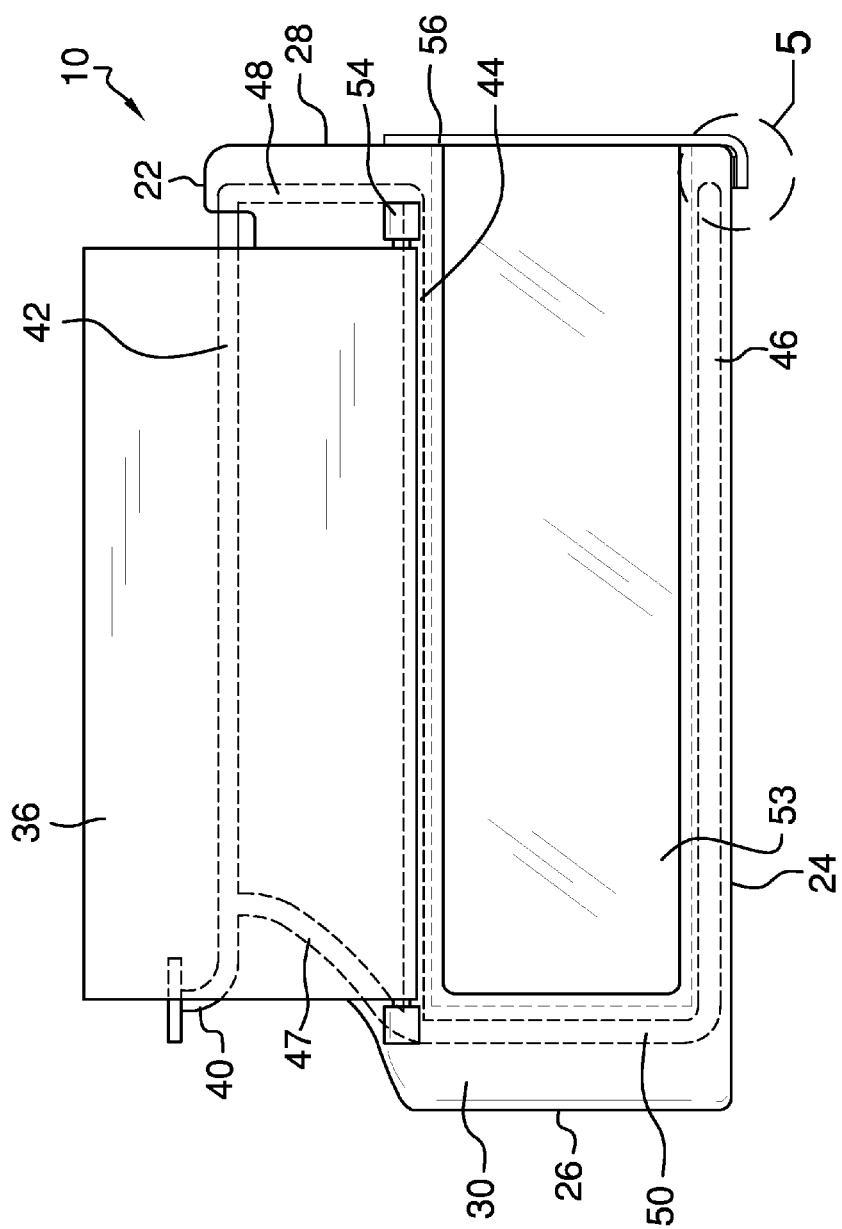
FIG. 2 is a front view with a mirror up and an insert disposed therein.
Figure 3:
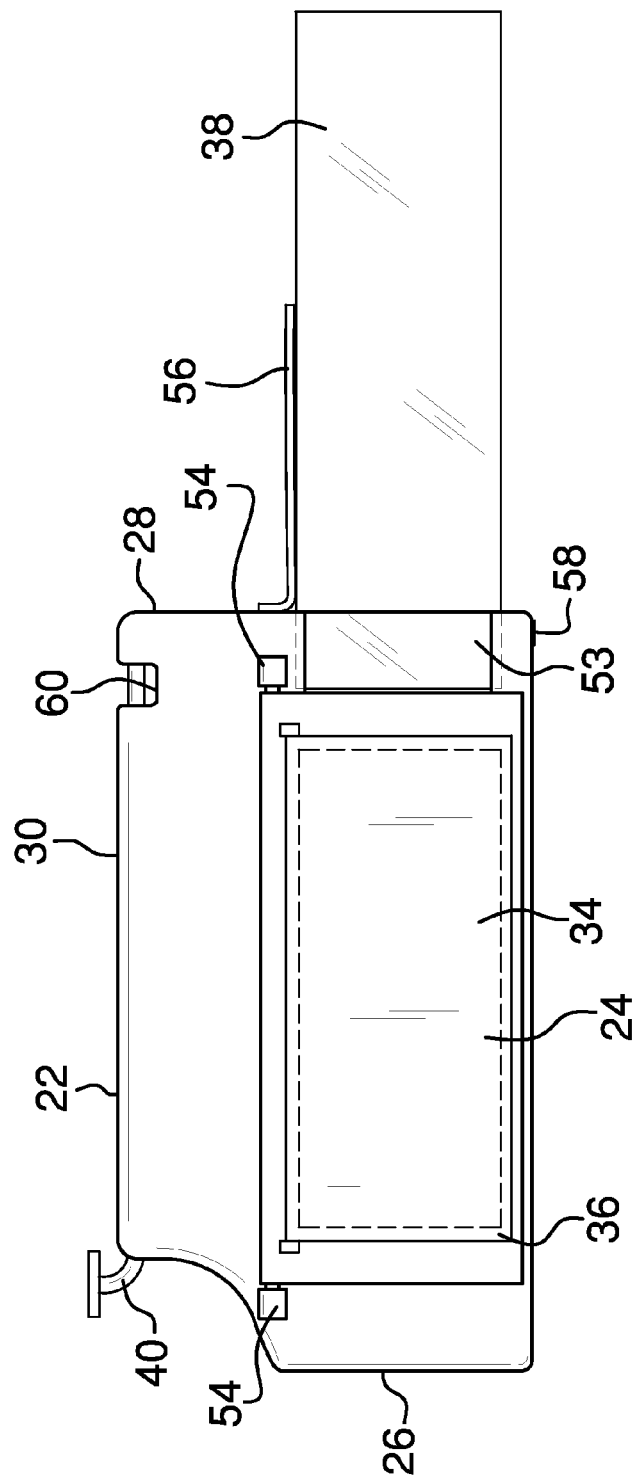
FIG. 3 is a front view with the mirror down and the insert extended.
Figure 4:
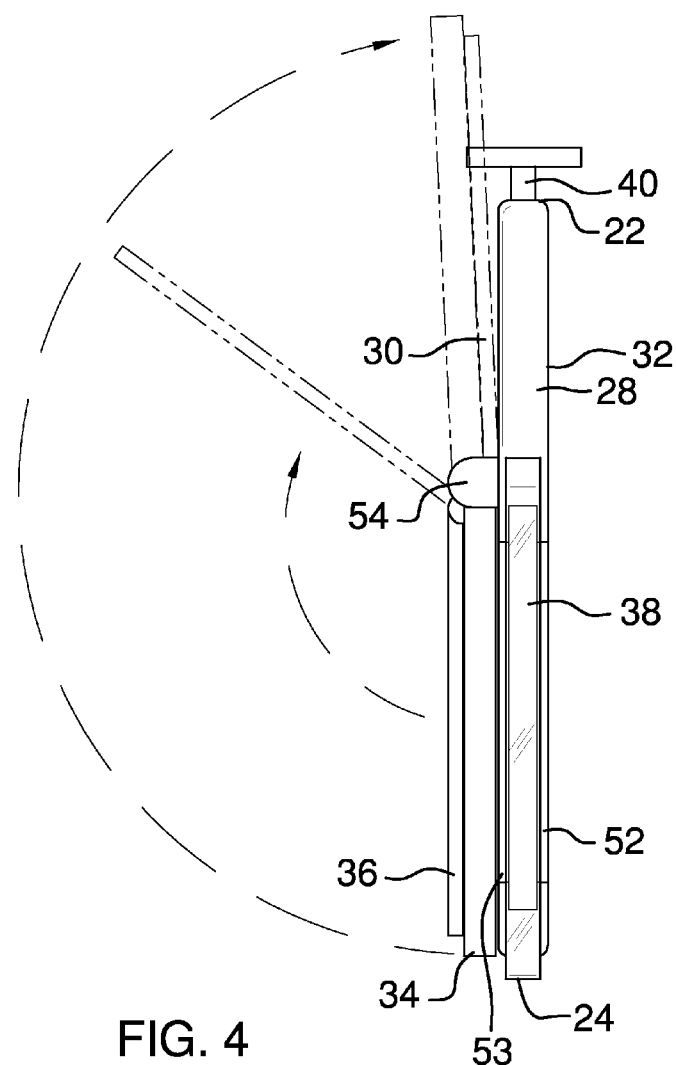
FIG. 4 is a side view.
Figure 5:
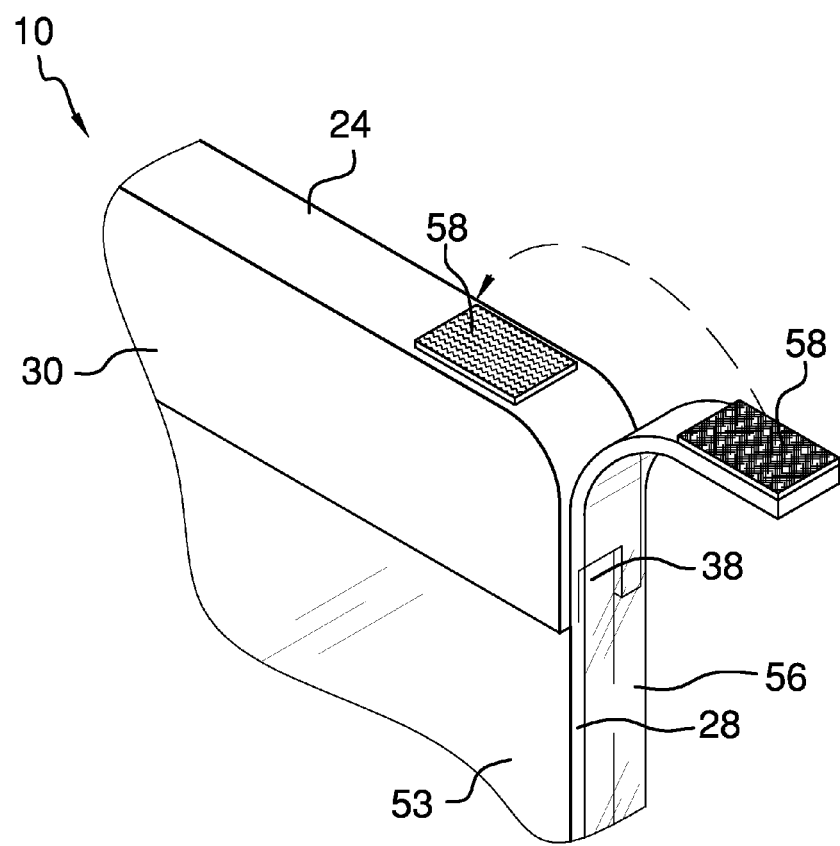
FIG. 5 is a detail view of a clear strap attachment to a primary flap.

With reference now to the drawings, and in particular FIGS. 1 through 5 thereof, example of the instant extensible sun visor employing the principles and concepts of the present extensible sun visor and generally designated by the reference number 10 will be described.

Referring to FIGS. 1 through 5 a preferred embodiment of the present extensible sun visor 10 is illustrated.

An extensible sun visor 10 includes a generally parallelepiped primary flap 20 depending from an interiorly mounted support rod 40. The primary flap 20 has a top edge 22, a bottom edge 24, a left edge 26, a right edge 28, an inside surface 30 and an outside surface 30. A mirror 34 is pivotally attached to the primary flap 20 inside surface 30. A cover 36 is pivotally attached to the mirror 34. A tinted transparent insert 38 is slidingly extensible from within the primary flap 10. The insert 38 extends outwardly from within the primary flap 20 right edge 28.

The support rod 40 engages a preexisting attachment hole 510 disposed in a car 500 interior roof. The support rod 40 is disposed within the primary flap 20, the support rod 40 includes an upper bar 42 horizontally disposed within the primary flap 20 proximal to the top edge 22, a medial bar 44 disposed parallel the upper bar 42, and a lower bar 46 disposed parallel the medial bar 44 proximal to the bottom edge 24.

The medial bar 44 is centrally disposed between the upper bar 42 and lower bar 46. The medial bar 44 is continuously attached to the upper bar 42 at a first side strut 47 and a second side strut 48, and the lower bar 46 is continuously attached to the medial bar 44 at a vertical member 50.

The transparent insert 38 slides between the support rod 40 medial 44 and lower 46 bars.

The primary flap 20 has a tinted transparent section 52 disposed on the flap 20 outside surface 32, the tinted section 52 overlying the transparent insert 38. The primary flap 20 also has a tinted transparent portion 53 disposed on the flap 20 inside surface 30, the tinted portion 53 overlying the transparent insert 38 opposite the transparent section 52.

The mirror 34 is pivotally attached to a pair of attachment members 54.

The primary flap 20 has a clear strap 56 attached to the right edge 28. The clear strap 56 is moveable from a vertical position to a horizontal position. The clear strap 56 secures the transparent insert 38 within the primary flap 20 when in the vertical position. The clear strap 56 attaches to the primary flap 20 bottom edge 24 by means of a hook and loop fastener 58.

The top edge 22 has a notch 60 disposed proximal the right edge 28, wherein the notch 60 releasably engages a preexisting clip (not shown) disposed in a car 500 interior roof.

What is claimed is:

1. An extensible sun visor comprising:
   a generally parallelepiped primary flap depending from an interiorly mounted support rod, the primary flap comprising a top edge, a bottom edge, a left edge, a right edge, an inside surface and an outside surface;
   a mirror pivotally attached to the primary flap inside surface;
   a cover pivotally attached to the mirror;
   a tinted transparent insert, slidingly extensible from the primary flap, wherein the insert extends outwardly from within the primary flap right edge;
   wherein the support rod engages a preexisting attachment hole disposed in a car interior roof;
   wherein the support rod is disposed within the primary flap, the support rod comprising:
      an upper bar horizontally disposed within the primary flap proximal to the top edge;
      a medial bar disposed parallel the upper bar;
      a lower bar disposed parallel the medial bar proximal to the bottom edge;
   wherein the medial bar is centrally disposed between the upper bar and lower bar;
   wherein the medial bar is continuously attached to the upper bar at a first side strut and a second side strut;
   the lower bar is continuously attached to the medial bar at a vertical member;
   wherein the transparent insert slides between the support rod medial and the lower bars;
   wherein the primary flap has a tinted transparent section disposed on the flap outside surface, the tinted section overlying the transparent insert;
   wherein the primary flap has a tinted transparent portion disposed on the flap inside surface, the tinted portion overlying the transparent insert opposite the transparent section;
   wherein the mirror is pivotally attached to a pair of attachment members;
   wherein the primary flap has a clear strap attached to the right edge, the clear strap moveable from a vertical position to a horizontal position, wherein the clear strap secures the transparent insert within the primary flap when in the vertical position.

2. The extensible sun visor of claim 1 wherein the clear strap attaches to the primary flap bottom edge by means of a hook and loop fastener.

3. The extensible sun visor of claim 2 wherein the top edge has a notch disposed proximal the right edge, wherein the notch releasably engages a preexisting clip disposed in a car interior roof.

* * * * *